United States Patent [19]

Udell

[11] 4,402,480
[45] Sep. 6, 1983

[54] ATMOSPHERE MODIFICATION SATELLITE

[76] Inventor: Debra M. Udell, 3214 Kingsbridge Ave., Bronx, N.Y. 10463

[21] Appl. No.: 208,473

[22] Filed: Nov. 19, 1980

Related U.S. Application Data

[63] Continuation-in-part of Ser. No. 42,444, May 25, 1979, abandoned.

[51] Int. Cl.³ .............................................. B64G 1/66
[52] U.S. Cl. ................................................ 244/158 R
[58] Field of Search ............... 244/158, 159, 160, 173, 244/161, 1 R; 239/1, 2, 14; 364/420; 324/330, 331; 455/12, 13, 89, 98, 610

[56] References Cited

U.S. PATENT DOCUMENTS

| | | | |
|---|---|---|---|
| 3,826,451 | 7/1974 | Grantham | 244/160 |
| 3,896,382 | 7/1975 | Magenheim | 455/12 |
| 3,953,727 | 4/1976 | Auria | 455/610 |
| 4,042,196 | 8/1977 | Brice | 244/158 |
| 4,097,010 | 6/1978 | Calambo et al. | 244/167 |
| 4,240,601 | 12/1980 | Reed | 244/160 |
| 4,273,305 | 6/1981 | Hinds | 244/160 |
| 4,305,555 | 12/1981 | Davis | 244/173 |

OTHER PUBLICATIONS

Duchossis, "Potential European Climatological Satellite Missions", Bulletin 17, Feb. 1979 (ESA).
Geddes et al, "Preliminary Design of a Tornado Probe", IEE Trans. on Geoscience Ele., vol. GE8, No. 4, 10-1970, pp. 279-284.
Press, "Introduction to the Nimbus Meteorological Satellite Program", IEE Trans. on Geosci. Ele., vol. GE8, No. 4, 10-1970, pp. 241-242.

Primary Examiner—Galen L. Barefoot
Attorney, Agent, or Firm—Debra M. Udell

[57] ABSTRACT

The Atmosphere Modification Satellite is intended to be the beginning of a possible world-wide network of satellites designed to improve Earth through application of techniques and monitoring resulting in atmosphere modification. Energy sources of said satellite consist of: solar, electrical, energy particle beam(s), laser and magnetohydrodynamics (MHD). At proper plane(s) of orbit, the satellite is capable of identifying target areas and administering "M-Probes" to monitor, sample and/or modify the atmosphere. There is no limit to the number of types of atmosphere modification the satellite will perform.

1 Claim, 1 Drawing Figure

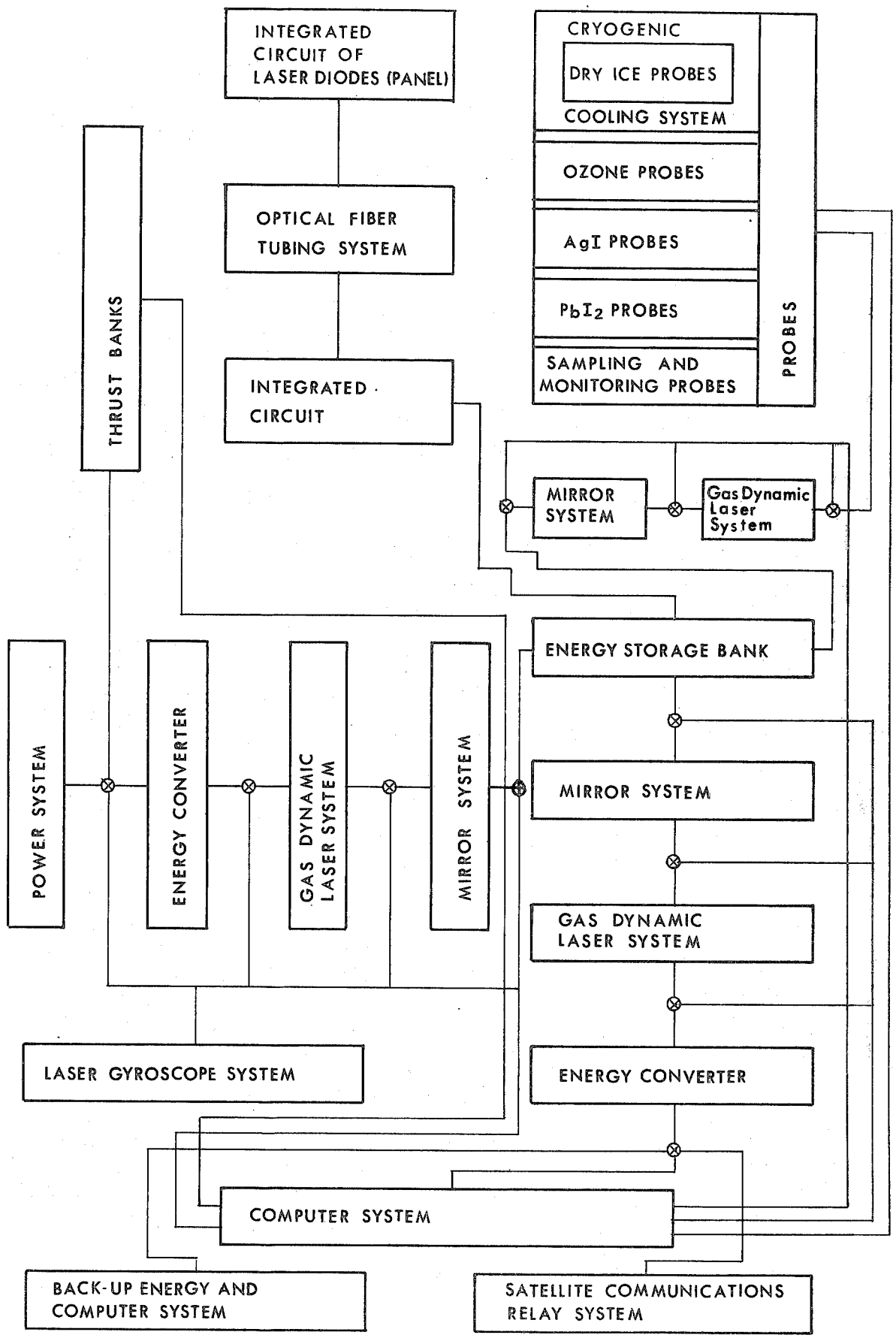

ATMOSPHERE MODIFICATION SATELLITE

This is a continuation-in-part of my earlier application U.S. Ser. No. 042,444, filed May 25, 1979, now abandoned.

SUMMARY OF THE INVENTION

The invention relates to meeting the needs of said atmosphere modification via space, rather than previous ground-based experimentation. There are numerous shapes and dimensions for said invention, as well as, a multitude of energy systems with back-up systems included. As mentioned supra, conventional means of modifying and monitoring the atmosphere has been ground-based: using balloons and airplanes; leaving humans exposed in dangerous and/or threatening weather conditions. Whereas, the implementation of trajectories from said Atmosphere Modification Satellite would remove the risk and assure accuracy. The "M-Probes" may be used to create changes in the air masses and fronts avoiding or dissipating the pressure systems normally created for hurricanes, tornadoes, and even the regulation of the monsoons which result in disaster to the inhabitants. Through the use of dry ice, AgI, $PbI_2$, etc., probes seeding cloud masses will result in controlled precipitation assuring water resources for agriculture, other consumption, and the redevelopment of wastelands. Other probes may be used for: fire-extinguishing, specialized crop-dusting, melting the ice caps and related icebergs, and radiation control. With concern for the diminishing ozone layer, ozone probes will correct monitored deficiencies. Ozone population will be increased where necessary by the implementation of a chain reaction caused by the excitation of oxygen with electrodes released by the probe.

Sampling and monitoring probes are guided systems which return samples of the atmosphere for metering, and/or data measuring the ozone concentration, insolation and radiation intensities (turbidity factor) and reflection phenomena (albedo), etc. Magnetosphere probes will permit sampling and monitoring of radiation in the form of cosmic rays-solar wind and the existence of gamma rays for further utilization. Other probes for the magnetosphere may modify the radiation and study shock waves emitted with a laser interferometer and photographic equipment.

Experimental charged probes may be used to correct the wobble of the Earth by reshaping the Van Allen Belts. Resulting in the prevention of earthquakes on the surface of the planet. Furthermore, temperature modification may be done by manipulating the magnetosphere probes, infrared probes, and other probes listed in the accompanying schematic; creating "greenhouse effects"—reradiated heat from the atmosphere. Thus the said Atmosphere Modification Satellite may be classified as a service satellite. For it provides the service of environment variation upon request creating "ideal" environments and strategic applications in meteorological warfare to prevent war, aggression, intervention, etc.

BRIEF DESCRIPTION OF THE DRAWING

The drawing of the said invention: ATMOSPHERE MODIFICATION SATELLITE shows the functional structure of the entire said satellite in block diagram form. Starting with the activation of the said satellite by solar energy through an integrated circuit of laser diodes the systems branch out as energy output increases. The schematic represents a step forward in energy conversion utilization, and discloses the techniques in physics and chemistry needed to achieve said: sampling, monitoring, and modification of the atmosphere.

DETAILED DESCRIPTION OF THE INVENTION

The said satellite is initially activated by the said integrated circuit of laser diodes (panel) listed in the said schematic. By this I mean a panel consisting of two different sides composing an exposed surface and inner surface. Energy absorbed from the sun, solar wind, and cosmic dust penetrates the exposed surface which consists of a solar panel which transmits its energy to the inner surface via photocell wiring. This inner surface consists of the laser diode circuit comprised of a temperature sensitive wiring made of a metal used for thermocoupling possibly doped with tantalum. As for the elements forming the laser diodes, it may be noted that the laser diode works on the same principle as a regular diode with the exception of the elements used for excitation of energy states are those used to produce laser emissions. Thus the cathode of a vacuum tube contains one of a multitude of elements (eg: ruby, gallium) used to produce laser light is heated and emits energy which flows to the anode (plate) of the tube. This one directional flow cannot be reversed. The emissions generated by the laser diodes are charged light beams. These charged light beams are passed through the optical fiber tubing system (the next black box component in the said schematic). The way this is done is the charged light beams from the said laser diodes are transmitted through an adapter through optical fiber tubing to a mirror-like photo-electric cell adapter to activate the integrated circuit. The elements comprising the said fiber tubing system are: said optical fiber tubing, said optical fiber tubing adapters, and said photo-cells (mirror-like and standard). As for how the beam of light is directed to the integrated circuit, it is done by passing the said charged beam of light through said optical fiber tubing to another said mirror-like photo-cell which initiates operation of the integrated circuit. The said integrated circuit is the main "on/off switch" for the operation of the said satellite with the exception of the back-up energy and computer system and the satellite communications relay system which may perform as override systems and operate the said satellite. (The said integrated circuit is the next system component on the schematic when following the sequence of operation of the said component systems of the said satellite.) As for the elements comprising the said integrated circuit, it can be noted that the said integrated circuit is one of a digital-logic nature consisting of: AND, NAND, OR, and NOR gates, inverters, and flip-flops.

With the switch turned on by the said mirror-like photo-cell the reflected charged light beam now enters the energy storage bank. (This is the next black box system in the said drawing.)

Elements comprising the energy storage bank are: a chamber containing mirrors attached to circular motor drives allowing 360° access, adapters, said optical fiber tubing, said optical fiber tubing adapters, switching mechanisms for directional flow of energy and a subchamber circular and spiraling in nature for storage of the semi-electrical light beam of energy. As for how the said energy storage bank operates on the theory of the cyclotron the following notes how. Just as the cyclotron is used to accelerate protons, deuterons, and helium nuclei, my energy storage bank accelerates and intensifies the beam of laser light semi-electrical energy by increasing the population of the particles raising the energy state and allowing a higher power output to be present through the use of the said optical fiber tubing and said mirrors on circular motor drives manipulating the semi-electrical light beam of energy in comparison, the same way a cyclotron does by repeated use of a moderate potential difference. As seen in the said drawing, the said energy storage bank provides the primary energy from the primary source: the said integrated circuit of laser diodes (panel) to the major control system including a direct connection to the primary computer system for control (through programming) of the components of the systems in the said satellite. The said major control system is defined as consisting of: said integrated circuit of laser diodes (panel), said integrated circuit, said optical fiber tubing system, said energy storage bank, and the following black box systems of components seen in said drawing emerging from the energy storage bank: mirror system, gas dynamic laser system, energy converter, computer system, satellite communications relay system, back-up energy and computer system, and the power system.

From the said energy storage bank the systems operate through three separate divisions each consisting of a mirror system and a gas dynamic laser system. (See said drawing.) Two of the divisions contain an energy converter. (See said drawing.) The three divisions are as follows:

1. mirror system, gas dynamic laser system, energy converter, computer system, satellite communications relay system, back-up energy and computer system 2. another said mirror system, another said gas dynamic laser system, another said energy converter, thrust banks, power system, laser gyroscope system 3. another said mirror system, another said gas dynamic laser system, probe system NOTE: All systems in the three divisions are connected directly to the primary computer system for control (through programming). (See said drawing.)
Following the said schematic said division #1 of the said satellite operates with the particles of energy in the form of a beam leaving the energy storage bank and passing through the said mirror system. The said beam of energy is transmitted through an adapter and more said optical fiber tubing from the said energy storage bank by another said switching mechanism to the said mirror system. The said mirror system consists of said optical fiber tubing, said adapters, said photo-cells (mirror-like and standard) and said mirrors connected to circular motor drives for 360° access.

Take note of the facts relevant to the relationship between population in the said energy beam and the said power output since the strength of the laser is defined in levels of energy by population ratios and thus the power output varies proportionally to the population of the energy state.

Following through said division #1 of the functional structure of the said satellite, the output of the said mirror system is relayed to the said gas dynamic laser system. As for the elements of the said gas dynamic laser system, this system consists of gas dynamic lasers (primary and auxilary), more said mirrors on circular motor drives with 360° access, more said adapters, and more said optical fiber tubing. The purpose of said auxilary gas dynamic lasers are to keep the beam regulated by the manipulation of said mirrors.

In said division #1 from the said gas dynamic laser system the output is transmitted to the energy converter which exchanges beam energy to electrical impulses. The elements of the said energy converter are a photocell panel with electric circuit wiring and switching mechanism, and modulator. In said division #1 the said electrical impulses run the computer system, satellite communications relay system, and the back-up energy and computer system through the defined linkage in the said drawing.

The computer system (as listed in said schematic) is programmed to operate the entire said satellite. As for the elements of said primary computer system, it consists of an already developed computer system modified to utilize programming at the capacity of operating the entire said satellite. This would also include modification of antenna design to permit transceiving of said program and correction of said program to be undecodable and unjammable by unauthorized persons with the exception of jamming as a result of natural phenomena. Aside from said program relay comprising part of the computer bank, the said computer system would consist of semi-conductor memory circuits, symbolic assemblers of varying complexity and versatility, compilers, monitors systems-circuitry devised to oversee switching mechanism and level of capacity of said program for control, capacity for floating point programs and mathematical function routines program, and a switching mechanism of binary nature built into the said satellite with a matching master computer system located at an Earth Satellite Station linked up for override and said program control and a link-up to the back-up energy and computer system and the satellite communications relay system and all other systems of the said satellite for power and said program relay. (This is all disclosed by said drawing.)

The said satellite communications relay system (seen in said drawing) permits communication with said computer system to retrieve data on operation of said satellite including data from sampling and monitoring probes and completion or non-utilization of atmosphere modification through the M-Probes, as well as override capabilities to the said computer system and said back-up energy and computer system. Said satellite communications relay systems consists of elements used in already developed systems such as Intelsat V and military satellite transponders such as the NATO-III Communications Subsystem which contains a multitude of filters, converters, limiters, and three circularly polarized horn antennas operating on a multi-mode principle made of graphite epoxy, transmitter, traveling wave tube assembly, 3-channel rotary joint, and a triplexer, and a single-conversion transponder. The performance parameters include: bandwidths of 17,50,85 MHz, with Uplink Frequencies at 8 GHz and Downlink Frequencies at 7 GHz with Offset Frequency at 725 MHz and wide beam antenna gain (peak) at 19.3 dB for the transmitter and 18.5 dB for the receiver and narrow beam antenna gain at 27.5 dB for the transmitter. As a result of these frequencies being used for military purposes modification of said system will be necessary to permit communication on levels acceptable to government standards while allowing said undecodability and said unjammability. The antenna must also be modified to transceive communications at accepted frequencies.

The back-up energy and computer system (as seen in said drawing) is linked up with the entire said satellite as a secondary source for said power and said programming to operate the said satellite when malfunction of any one of the said primary systems occurs and for additional said power and said programming as it is needed by said satellite. The said secondary computer system is the same as said primary computer system and is connected to the said secondary energy system which consists of another said solar energy-energy conversion system operating a magnetohydrodynamic (MHD) generator, where the elements are ionized gas passed through electrode plates resulting with an output transmitted in electrical impulses to operate said satellite.

Following the said schematic said division #2 of the said satellite operates with the said charged energy beam entering another said mirror system then continuing to another said gas dynamic laser system to another said energy converter. The said electrical impulses output of the said energy converter then operates the said thrust banks, said power system, and said laser gyroscope system.

The said thrust banks (seen in said drawing) consists of the following elements: injection throttled variable thrust rocket engines where the fuel and oxidizer are in separate tanks and mixed only upon injection into the combustion chamber, to which they are fed by pumps of pressurization. The combustion chamber is regeneratively cooled by the fuel. Since the flow rate determines the amount of thrust delivered, switching mechanisms programmed by said computer system open and close the fuel valves.

The power system (seen in said drawing) supplies additional energy to the said thrust banks, said gyroscope and all other said systems of the said satellite through the said computer. The power system consists of: said adapters, and said switching mechanisms, and a large generator for producing electricity as its output yielding power to operate the said satellite indefinitely through distribution through the said computer system.

The said laser gyroscope system (seen in said drawing) consists of a chamber containing a free (directional) gyroscope made of mirror material with three mirror-like gimbals, said switching mechanisms, frictionless bearings, and primary and auxilary lasers (eg: ruby) and said mirrors on motor drives with 360° access. The lasers are set on a circular track on motor drives with a 3-dimensional 360° access surrounding the gimbals of the gyroscope. The auxilary laser is used to align the primary laser which reflects off the spin angular velocity established by the innermost gimbal, the nutational angular velocity of the middle gimbal and the precession angular velocity of the outermost gimbal and records the data, and navigates the said satellite and the said satellite's planes of orbit and initial direction of said M-Probes of the said probe system through the said computer system, and said thrust banks.

Following the said schematic said division #3 of the said satellite operates with the said charged energy beam entering another said mirror system then continuing to another said gas dynamic laser system. The output is relayed to the said probe system which consists of chambers on motor drives with 360° access containing small rocket probes with computer remote control automatic pilots which are launched by said computer system through said optical fiber tubing connected to said photo-cell (mirror-like and standard) adapters and said switching mechanism which activate the said probe system. There is a basic structure for the "M-Probe". The "M-Probe" is a said small rocket probe consisting of small but powerful thrust engines with an on-board computer programmed by said satellite's computer system with said computer remote control automatic pilot. The contents for modification and monitoring and sampling vary with the programming. Examples of said "M-Probes" are dry ice, ozone, AgI, $PbI_2$, etc. The satellite identifies the target areas using data provided by the said computer system provided by data submitted through the said satellite communications relay system and programs the laser gyroscope and thrust banks to adjust its orbital position to launch the said M-Probes which take over the atmosphere modification process and monitoring and sampling process. "M-Probes" create changes in air masses by controlling the fronts established by cyclones, hurricanes and tornadoes by warming the atmosphere or cooling the atmosphere with the use of a specified M-Probe air masses may be controlled reversing the fronts and preventing cyclones, hurricanes, and tornadoes from occurring. Examples of said probes are laser probes, electrical conductivity probes, and rain-snow making probes.

Upon identifying the target area the said computer system programs the said rain-making M-Probe for seeding cloud masses located at a particular location as given by the said computer. Having determined the amount of precipitation required and the size of the cloud masses and size of the area to be precipitated upon, the said probe is launched. The said M-Probe travels to its destination and releases its contents: the dry ice, AgI, or $PbI_2$ at the computed points.

Since the M-Probe acts as a guided missile it may be programmed to fly at low altitudes like an airplane and thus be used for fire-extinguishing and specialized crop-dusting when filled with the proper chemicals and release them at specific target points as programmed by the said computer system of the said satellite.

Laser M-Probes containing powerful $CO_2$ (carbon dioxide) lasers may be used to melt ice-caps and icebergs by emission from an M-Probe at close range when programmed.

Levels of radiation may be measured through absorption of premeasured vents of the specified M-Probe and corrected chemically by inducing catalystic elements to dissipate the excess radiation.

Ozone deficiencies may be measured by M-Probes registering the amount of UV (ultraviolet radiation) being present in a given area and the location of cloud masses and may be remedied through atmosphere modification using said ozone probes. These said probes are equipped with electrical discharge units to create chain reactions creating ozone as it flys through a given target area.

Samples are collected by the M-Probes by vent absorption and analyzed by the said on-board computer. The data is then transferred to the said computer system of the said satellite and the said M-Probe returns to the said satellite as programmed.

Magnetosphere probes may be used consisting of the basic said M-Probe structure and a chamber containing an ionized gas or some other charged element creating a charged probe and either dispensing the charged particles or flying through the target area with the charged element resulting in changes in the structure of the Van Allen Belts by the population ratio of discharged particles and chain reactions stabilizing the mass of the Earth preventing earthquakes by launching the said rocket probe from said satellite which is not always a synchronous satellite as listed in U.S. Pat. 4,042,196 by Brice.

Modifying the atmosphere with magnetosphere probes allows a disruption of conductivity in the atmosphere to occur while infrared probes would heat the atmosphere. If this conductivity and heat is increased there is more heat to strike the earth's surface and rebound as infrared radiation from the earth's surface. This secondary warming of the earth's surface as the infrared radiation dissipates is known as the greenhouse effect and if increased in occurance the temperature will be modified. The infrared probes would consist of the basic M-Probe structure as previously stated and contain infrared units.

I claim:

1. A satellite for atmospheric modification, sampling and monitoring comprising: a solar panel to absorb and transmit solar energy to an arrangement of laser diodes on an inner surface thereof, wherein, said laser diodes emit an intense beam of light; an optical fiber tubing system connected to said laser diodes for transmitting said intense beam of light to an integrated circuit means; said integrated circuit means emit a beam of semi-electrical energy; an energy storage bank connected to said integrated circuit means thereof, wherein, particles of said beam of semi-electrical energy constantly increase their velocity with motion while said beam of semi-electrical energy is stored and directed to the remaining systems through linkage with a computer; a first mirror system means connected to said energy storage bank varying the frequency of radiation emission with said computer linkage varying the power output thereof, wherein, the said power output varies proportionally to the population of the said energy state; a first gas dynamic laser system means connected to said first mirror system means, wherein, the resulting power output is increased with relay to the remaining systems; a first energy converter connected to said first gas dynamic laser system means to exchange said beam energy to electrical impulses; a computer system connected to said first energy converter programmed to operate the entire satellite through computer linkage to said energy storage bank, said first mirror system means, said first gas dynamic laser system means, said first energy converter, and all remaining elements and systems of said satellite; a satellite communications relay system connected to said first energy converter for transmittance from an Earth Station to override program of said computer for various functions; a back-up energy and computer system connected to said first energy converter, wherein, a second computer system continues the work if the primary computer malfunctions or needs additional programming and, wherein, a secondary energy system consisting of a magnetohydrodynamic (MHD) generator where ionized gas is the fluid passed through electrode plates which provides an additional power output; a second mirror system means connected to said energy storage bank varying the frequency of radiation emission with said computer linkage varying the power output thereof, wherein, the said power output varies proportionally to the population of the said energy state; a second gas dynamic laser system means connected to said second mirror system means, wherein, the resulting power output is increased with relay to the remaining systems; a second energy converter connected to said second gas dynamic laser system means to exchange said beam energy to electrical impulses; a thrust banks means connected to said second energy converter to manuever said satellite in and out of appropriate planes of orbit as determined by connection with said computer control, said satellite communications relay system and a laser gyroscope system means; said laser gyroscope system means connected to said second energy converter receives said electrical impulses to operate a laser to regulate the movement of said satellite and the initial direction of probes for atmospheric modification, sampling and monitoring; a power system means connected to said second energy converter to supply energy to said thrust banks means, said gyroscope means, and other areas of said satellite through said computer; a third mirror system means connected to said energy storage bank varying the frequency of radiation emission with said computer linkage varying the power output thereof, wherein, the said power output varies proportionally to the population of the said energy state; a third gas dynamic laser system means connected to said third mirror system means, wherein, the resulting power output is increased with relay to the remaining system; a probe system connected to said third gas dynamic laser system means, wherein, each probe has a remote control guidance system where the frequency is aligned with said computer and groundbase control and, wherein, said probes will be used to initiate techniques in atmospheric modification using dry ice, AgI, PbI$_2$ rain-making and snow-making M-Probes, ozone M-Probes, magnetosphere M-Probes, charge M-Probes, Laser M-Probes, Infrared M-Probes, and atmospheric sampling and monitoring through sampling and monitoring M-Probes.

* * * * *